United States Patent
Park et al.

(10) Patent No.: US 10,028,080 B2
(45) Date of Patent: **\*Jul. 17, 2018**

(54) METHOD AND APPARATUS FOR ESTABLISHING COMMUNICATION BETWEEN AN IMAGE PHOTOGRAPHING APPARATUS AND A USER DEVICE

(71) Applicant: SAMSUNG ELECTRONICS CO., LTD., Suwon-si, Gyeonggi-do (KR)

(72) Inventors: Jong-ho Park, Suwon-si (KR); Hyung-soo Park, Incheon (KR); Gun-bae Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,813

(22) Filed: May 3, 2017

(65) Prior Publication Data

US 2017/0238128 A1 Aug. 17, 2017

Related U.S. Application Data

(63) Continuation of application No. 14/308,908, filed on Jun. 19, 2014, now Pat. No. 9,686,636.

(30) Foreign Application Priority Data

Jul. 31, 2013 (KR) ........................ 10-2013-0091077

(51) Int. Cl.
*H04B 7/00* (2006.01)
*H04W 4/00* (2018.01)
(Continued)

(52) U.S. Cl.
CPC .......... *H04W 4/008* (2013.01); *H04L 67/146* (2013.01); *H04N 5/23206* (2013.01);
(Continued)

(58) Field of Classification Search
CPC . H04W 84/18; H04M 1/7253; G06K 19/0723
(Continued)

(56) References Cited

U.S. PATENT DOCUMENTS 7,970,350 B2 6/2011 Sheynman et al.
8,271,662 B1 9/2012 Gossweiler, III et al.
(Continued)

FOREIGN PATENT DOCUMENTS

EP 2 302 560 A1 3/2011
EP 2 445 257 A1 4/2012
(Continued)

OTHER PUBLICATIONS

Crisp, "Panasonic DMC-GF6 brings NDF to interchangeable lens cameras," Gizmag.com, retrieved from internet website: http://www.gizmag.com/panasonic-gf6-nfc/26985/, Apr. 10, 2013, pp. 1-5.
(Continued)

*Primary Examiner* — Lee Nguyen
(74) *Attorney, Agent, or Firm* — Jefferson IP Law, LLP

(57) ABSTRACT

A method and apparatus for establishing communication between an image photographing apparatus and a user device is provided. In one implementation, the image photographing apparatus includes a communication module; a short-distance wireless communication module; and a controller. When tagging between the image photographing apparatus and a user device occurs, the short-distance wireless communication module provides connection information to the user device via short-distance wireless communication, the controller activates the communication module, and the communication module establishes communication with the user device using the connection information.

20 Claims, 12 Drawing Sheets

(51) Int. Cl.
  *H04L 29/08*    (2006.01)
  *H04N 5/232*    (2006.01)
  *H04W 4/80*     (2018.01)
  *H04W 76/14*    (2018.01)
  *H04L 29/06*    (2006.01)

(52) U.S. Cl.
  CPC .............. *H04W 4/80* (2018.02); *H04W 76/14* (2018.02); *H04L 69/14* (2013.01); *H04L 69/24* (2013.01)

(58) Field of Classification Search
  USPC ................................................ 455/41.1–41.3
  See application file for complete search history.

(56) References Cited

U.S. PATENT DOCUMENTS

| | | | |
|---|---|---|---|
| 9,686,636 B2* | 6/2017 | Park | ............ H04W 4/008 |
| 2012/0317194 A1 | 12/2012 | Tian | |
| 2013/0009752 A1 | 1/2013 | Finkenzeller et al. | |
| 2013/0078922 A1 | 3/2013 | Griffin et al. | |

FOREIGN PATENT DOCUMENTS

| | | |
|---|---|---|
| EP | 2 582 160 A1 | 4/2013 |
| EP | 2 600 679 A1 | 6/2013 |
| KR | 10-2013-0031086 A | 3/2013 |

OTHER PUBLICATIONS

Sony Corporation, "Interchangeable Lens Digital Camera α Handbook," Sony Europe Website, retrieved from internet website: http://donwload.sony-eurone.com/pub/manuals/consumer/4472074111.pdf, Jan. 1, 2012, pp. 1-260.
Steffens et al., "The SIM-based mobile wallet," 13th International Conference on Intelligence in Next Generation Networks, ICIN 2009, Bordeaux, IEEE, 2009, pp. 1-6.
Tomkins, "Panasonic Lumix GF6 Review," retrieved from internet website: http://www.imaging-resource.com/PRODS/panasonic-gf6/panasonic-gf6A.HTM , Apr. 9, 2013, pp. 1-7.
Extended European Search Report issued for related application EP 14153028.7, dated Apr. 28, 2014, 8 pages.
Examination Report issued for related application EP 14153028.7, dated Nov. 27, 2014, 5 pages.
Examination Report issued for related application EP 14153028.7, dated May 8, 2015, 5 pages.
Examination Report issued for related application EP 14153028.7, dated Oct. 7, 2015, 6 pages.
Examination Report issued for related application EP 14153028.7, dated Mar. 16, 2016, 3 pages.
Summons to Attend Oral Proceedings issued in related application EP 14153028.7, dated Jan. 11, 2017, 7 pages.
Examination Report issued in related application EP 14153028.7, dated Apr. 10, 2017, 5 pages.

* cited by examiner

<HW OPERATION SIGNAL OF FIELD DETECTION PORT>

<EVENT CHECK SIGNAL (SW PROCESS)>

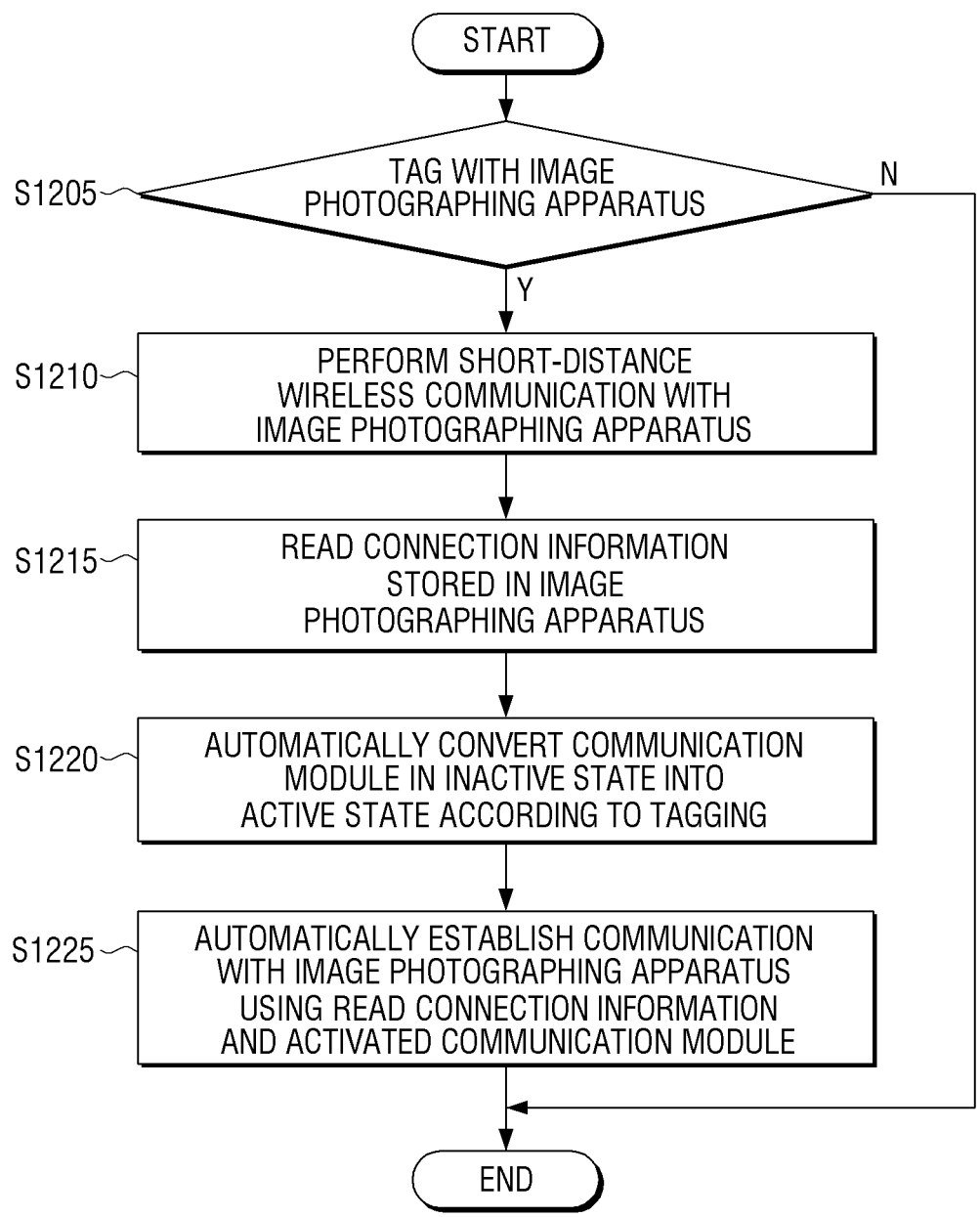

METHOD AND APPARATUS FOR ESTABLISHING COMMUNICATION BETWEEN AN IMAGE PHOTOGRAPHING APPARATUS AND A USER DEVICE

CROSS-REFERENCE TO RELATED APPLICATIONS

This application is a continuation of U.S. patent application Ser. No. 14/308,908, filed Jun. 19, 2014, which claims the priority benefit under 35 U.S.C. § 119(a) from Korean Patent Application No. 10-2013-0091077, filed on Jul. 31, 2013, in the Korean Intellectual Property Office, the disclosures of which are incorporated herein by reference in their entirety.

BACKGROUND

1. Field

Apparatuses and methods consistent with the present disclosure relate to an image photographing apparatus, a user device, and a method for establishing communication between the image photographing apparatus and the user device, and more particularly, to an image photographing apparatus, a user device, and a method for establishing communication between the image photographing apparatus and the user device using short-distance wireless communication.

2. Description of the Related Art

By virtue of the development of electronic technologies, various types of electronic devices have been developed and become widespread, and exchanging wireless communication and information between electronic devices has become easier. In particular, as user devices such as portable phones, smart phones, tablet personal computers (PCs), etc. have become widespread, wireless communication between electronic devices and user devices has gradually increased. User devices are more easily controlled and thus more users are using wireless communication to control user devices with electronic devices or to control information on electronic devices with user devices.

In particular, as image photographing apparatuses and user devices have become widespread, it is now possible to transmit an image captured by an image photographing apparatus to a user device and to store or control the image with the user device or to control the image photographing apparatus with the user device during photography via communication between the image photographing apparatus and the user device.

However, in order to establish wireless communication between an image photographing apparatus and the user device, a user needs to go through the inconvenience of adjusting the settings or otherwise manipulating each device separately.

Accordingly, there is a need for a technology for establishing wireless communication between an image photographing apparatus and a user device via a simple user manipulation.

SUMMARY

Various embodiments of the invention overcome the above disadvantages and other disadvantages not described above. However, the embodiments described herein are not required to overcome the disadvantages described above, and some embodiments may not overcome any of the problems described above.

An embodiment of the invention provides an image photographing apparatus, a user device, and a method for establishing communication between the image photographing apparatus and the user device using short-distance wireless communication.

According to an embodiment, an image photographing apparatus includes a communication module; a short-distance wireless communication module; and a controller. When tagging between the image photographing apparatus and a user device occurs, the short-distance wireless communication module provides connection information to the user device via short-distance wireless communication, the controller activates the communication module, and the communication module establishes communication with the user device using the connection information.

The short-distance wireless communication module may generate an interrupt signal to the controller when the tagging occurs, and the controller may activate the communication module when the interrupt signal is received.

The controller may periodically check whether a near field communication (NFC) signal is input from the short-distance wireless communication module, and activate the communication module when the NFC signal is input.

The controller may provide a live view to the user device when communication with the user device is established and a pre-view mode for displaying the live view is selected. The controller may also provide a content reproduction image to the user device through the communication module when a reproduction mode for reproduction of content is selected.

The short-distance wireless communication module may receive position information of the user device when re-tagging between the image photographing apparatus and the user device occurs during an operation in the pre-view mode. The controller may match a captured image and the position information when the image is captured.

According to another embodiment, a user device includes a communication module configured to perform communication; a short-distance wireless communication module configured to perform short-distance wireless communication with an image photographing apparatus to read connection information stored in the image photographing apparatus when tagging between the user device and the image photographing apparatus occurs; and a controller configured to activate the communication module into an active state in which the communication module establishes communication with the image photographing apparatus using the read connection information.

The short-distance wireless communication module may read additional information from the image photographing apparatus, and the controller may automatically perform an operation corresponding to the additional information when the additional information is read.

The user device may also include a display. The controller may receive a live view through the communication module and display the live view on the display when the communication with the image photographing apparatus is established and the image photographing apparatus operates in a pre-view mode for displaying the live view. The controller may receive content through the communication module and display the content on the display when the image photographing apparatus operates in a reproduction mode for reproduction of the captured content.

The controller may transmit position information to the image photographing apparatus through the communication module when the live view is received through the communication module and displayed, when tagging between the user device and the image photographing apparatus occurs.

According to another embodiment, a method for establishing communication with a user device is carried out by an image photographing apparatus. In this embodiment, the method, which is carried out when tagging between the user device and the image photographing apparatus occurs, includes performing short-distance wireless communication with the user device using a short-distance wireless communication module; providing connection information to the user device via the short-distance communication; automatically converting a communication module in an inactive state into an active state; and automatically establishing communication with the user device using the connection information and the activated communication module.

The method may also include checking whether an interrupt signal is generated from the short-distance wireless communication module as a result of the tagging. If the interrupt signal is generated, the communication module may automatically be converted into the active state.

The method may further include periodically checking whether a near field communication (NFC) signal is input from the short-distance wireless communication module. The communication module may automatically be converted into the active state when the NFC signal is input.

The method may also include providing a live view to the user device through the communication module when a pre-view mode for displaying the live view is performed; and providing a content reproduction image to the user device through the communication module when a reproduction mode for reproduction of content is performed.

The method may also include receiving position information of the user device through the short-distance wireless communication module when re-tagging between the image photographing device and the user device is performed during an operation in the pre-view mode; and matching and storing a captured image and the position information when the image is captured.

According to yet another embodiment, a method for establishing communication with an image photographing apparatus is carried out by a user device. In this embodiment, the method includes performing short-distance wireless communication with the image photographing apparatus when tagging between the user device and the image photographing apparatus occurs; reading connection information stored in the image photographing apparatus via the short-distance wireless communication; automatically activating a communication module; and automatically establishing communication with the image photographing apparatus using the read connection information and the activated communication module.

The method may further include reading additional information from the image photographing apparatus; and automatically performing an operation corresponding to the additional information when the additional information is read.

The method may also include receiving a live view through the communication module and displaying the live view when the communication with the image photographing apparatus is established and the image photographing apparatus operates in a pre-view mode for displaying the live view; and receiving content through the communication module and displaying the content when the image photographing apparatus operates in a reproduction mode for reproduction of the captured content.

The method may also include transmitting position information to the image photographing apparatus through the short-distance wireless communication module when the live view is received through the communication module and displayed and tagging between the image photographing apparatus and the user device occurs.

BRIEF DESCRIPTION OF THE DRAWINGS

The above and/or other aspects will be more apparent and more readily appreciated from the following description of the embodiments, taken in conjunction with the accompanying drawings of which:

FIG. 12 is a flowchart of a method for establishing communication of a user device according to an embodiment.

DETAILED DESCRIPTION

Embodiments of the disclosure will now be described in greater detail with reference to the accompanying drawings. A detailed description of known functions and configurations incorporated herein will be omitted when it may make the subject matter unclear. The terms used in the specification are defined in consideration of functions used in this disclosure, and can be changed according to the intent or conventionally used methods of clients, operators, and users. Accordingly, definitions of the terms should be understood on the basis of the entire description of the specification.

Figure 1:
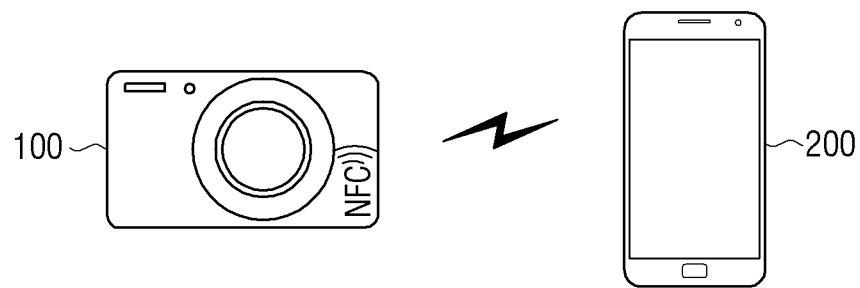
FIG. 1 is a diagram of an image photographing apparatus and a user device according to an embodiment.

FIG. 1 is a diagram of an image photographing apparatus 100 and a user device 200 according to an embodiment. As illustrated in FIG. 1, the image photographing apparatus 100 may be a digital camera but is purely exemplary. Thus the image photographing apparatus 100 may be embodied as any of various electronic devices such as a camcorder, a smart phone, a tablet personal computer (PC), a personal digital assistant (PDA), etc. that include an image capturer 160. In addition, the user device 200 may be a portable phone but is purely exemplary. The user device 200 may be embodied as any of various electronic devices such as a tablet PC, a digital camera, a camcorder, a notebook PC, a PDA, a TV, etc. that include a display 240.

The image photographing apparatus 100 and the user device 200 include respective short-distance wireless communication modules 120 and 220 that perform short-distance wireless communication. The short-distance wireless communication may be near field communication (NFC). That is, a the short-distance wireless communication module 220 may communicate with the short-distance wireless communication module 120 of the image photographing apparatus 100 by NFC communication when the user device 200 tags the photographing apparatus 100 on a portion of the photographing apparatus 100 containing the short-range wireless communication module.

"NFC communication" refers to a contactless short-distance wireless communication technology that uses a frequency band of 13.56 MHz and transmits data between user devices at a relatively short distance—e.g., within 10 cm. NFC communication technology may be used to transfer information, etc., as well as to provide data communication between user devices (e.g., smart phones) or a user device and a tag. In addition, NFC technology provides compatibility with a conventional smart card and radio frequency identification (RFID) and thus may partially use existing infrastructures.

RFID technology supports only simplex communication between active type read/write and a passive tag while NFC technology enables two-way communication between active type devices as well as simplex communication. Thus the NFC Forum specifies two modes that are applied based on this technology.

A first mode is a card emulation mode for an operation as a passive tag of a contactless IC card type. In the card emulation mode, information stored in a device is transmitted to an external active user device. The card emulation mode is used in various fields such as contactless mobile payment, user authentication, etc. Thus, application services of the card emulation mode have been actively developed.

A second mode is a Read/Wire (R/W) mode for reading and recording external passive tag information. This mode may provide application services using electronic posters, information inquiry and record, etc. Comparing the R/W mode with a QR code technology, the QR code technology requires the use of separate application to accurately recognize a QR code, but the R/W mode of NFC allows obtaining external tag information simply and intuitively via an NFC support device.

A last mode is a peer-to-peer (P2P) mode. In the P2P mode, two NFC support user devices establish a connection therebetween via communication in an active mode to transmit multimedia data and other information. The P2P mode may usually provide application services through the exchange of an electronic card, a picture, or voice data, and the exchange of information and data for Bluetooth and WiFi connections.

When the image photographing apparatus 100 and the user device 200 engage in short-distance wireless communication using NFC communication, the short-distance wireless communication may be performed in any one of the card emulation mode, the R/W mode, and the P2P mode.

As illustrated in FIG. 1, a portion of the surface of the image photographing apparatus 100 contains an NFC communication module (including an NFC antenna and an NFC tag chip) and one surface of the user device 200 includes an NFC communication module. Short-distance wireless communication between the two devices may be performed by tagging (touching or coming close to) surface of the user device 200 having the NFC reader on the portion of the image photographing apparatus containing the NFC communication module.

Figure 2:
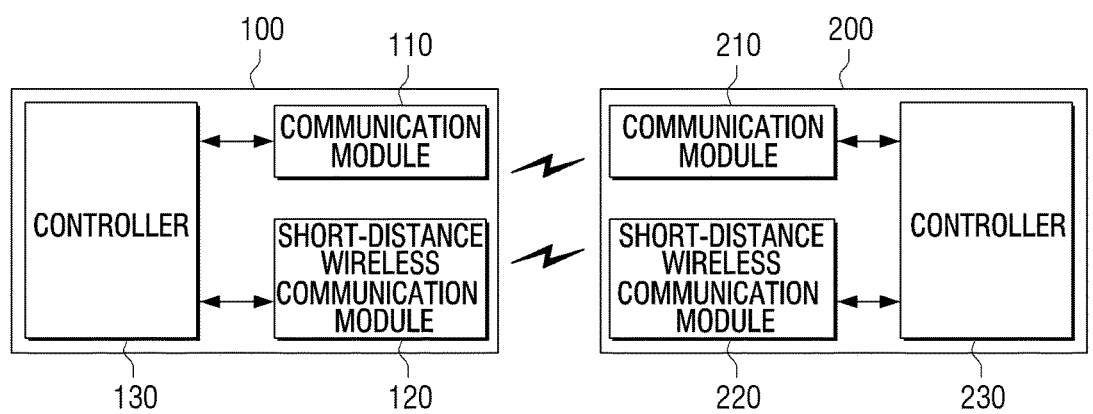
FIGS. 2 and 3 are a schematic block diagrams illustrating the configuration and connection of an image photographing apparatus and a user device, according to an embodiment.

FIG. 2 is a schematic block diagram illustrating the configuration and connection of the image photographing apparatus 100 and the user device 200. As illustrated in FIG. 2, the image photographing apparatus 100 and the user device 200 include communication modules 110 and 210, short-distance wireless communication modules 120 and 220, and controllers 130 and 230, respectively. In addition, the communication modules 110 and 210 of the image photographing apparatus 100 and the user device 200 may perform wireless communication and the short-distance wireless communication modules 120 and 220 of the image photographing apparatus 100 and the user device 200 may perform short-distance wireless communication.

The image photographing apparatus 100 and the user device 200 (electronic devices) carry out wireless communication with one another using the communication modules 110 and 210. The image photographing apparatus 100 and the user device 200 may carry out wireless communication using WiFi or a Bluetooth®.

WiFi communication refers to a series of technologies for supporting connection between IEEE 802.11-based wireless local area networks (LANs), connection between devices, configuration of LANs, wide area networks, personal area networks, etc. WiFi communication basically refers to communication between a user device and an access point (AP) for transmitting data over the Internet. The user device may include component hardware such as a wireless LAN card in order to carry out WiFi communication and may include a device driver to enable an operating system (OS) to recognizing the wireless LAN card.

Bluetooth® enables communication between various user devices using the IEEE 802.15.1 standard. The frequencies used in Bluetooth® communication are at or near 2.45 GHz, which is an ISM band. In versions 1.1 and 1.2, the data rate reaches 723.1 kbps. Version 2.0 has the enhanced data rate (EDR) feature that reaches a data rate of 2.1 Mbps. One of the concepts of Bluetooth® is that it replaces a wired universal serial bus (USB) and uses secure and fast encryption routine (SAFER)+for encryption in order to achieve pairing using a keyword.

Thus, the communication modules 110 and 210 may include various communication chips such as a WiFi chip, a Bluetooth® chip, a wireless communication chip, etc. which perform communication via WiFi or the Bluetooth®. When a WiFi chip or a Bluetooth chip is used, various connection information, such as an SSID, a session key, etc., may be transmitted and received prior to communication. Then, communication may be established, after which various types of information may be transmitted and received. "Wireless communication chip" refers to a chip for communication according to various communication standards such as IEEE, Zigbee, 3rd generation (3G), 3rd generation partnership project (3GPP), long term evolution (LTE), etc.

The communication modules 110 and 210 may be maintained in an inactive state prior to the image photographing apparatus 100 and the user device 200 tagging, and then activated when the two devices tag.

The short-distance wireless communication modules 120 and 220 may be configured for short-distance wireless communication with an external electronic device and may perform short-distance wireless communication when the image photographing apparatus 100 and the user device 200 are completely tagged.

When NFC communication is used for the short-distance wireless communication, the short-distance wireless communication module 120 of the image photographing apparatus 100 may include an NFC tag chip and an NFC antenna. When the user device 200 tags the image photographing apparatus, the NFC antenna receives current contained in the user device 200 and generates a magnetic field to operate the NFC tag chip. When operating, the NFC tag chip may transmit an interrupt signal or an NFC signal to the controller 130. In addition, the NFC tag chip and the controller 130 are connected via a communication port (I2C, SPI, serial, etc.). When connection is established via the communication port, the NFC tag chip may transmit a degree by which wireless communication is established with the user device 200 to the controller 130 through the communication port.

The NFC tag chip may include a non-volatile memory (e.g., an NVRAM) and a volatile memory (e.g., a RAM), store connection information and additional information, and transmit connection information to the user device 200 by tagged by the user device 200. That is, unchanged dedicated information of the image photographing apparatus 100 may be stored in the non-volatile memory and information that is transmitted to and received from the user device 200 in real time may be stored in the non-volatile memory.

The connection information may be service set identifier (SSID) information stored in the NFC tag chip and the additional information may be Uniform Resource Locator (URL) information. The SSID information may be information for used by the user device 200 to pair with the image photographing apparatus 100. The URL information refers to a download address of an application that is supposed to be displayed or an address of an application when the user device 200 establishes communication.

The short-distance wireless communication module 220 of the user device 200 may be an NFC reader. Thus, the user device 200 can tag the image photographing apparatus 100 to engage in short-distance wireless communication using NFC and read the connection information of the image photographing apparatus 100, which is stored in the NFC tag chip.

The controllers 130 and 230 are components that control the overall operation of the image photographing apparatus 100 and the user device 200.

When the user device 200 tags the image photographing apparatus 100, the controller 130 of the image photographing apparatus 100 may change the communication module 110 from an inactive state to an active state and automatically establish communication with the user device 200 using the connection information and the activated communication module.

In detail, when tagging of the user device 200 is performed, the controller 130 may receive an interrupt signal from the NFC tag chip of the short-distance wireless communication module 120 and periodically check whether the NFC signal is input from the NFC tag chip. The controller 130 may activate the communication module 110 in an inactive state according to the received interrupt signal or the checked NFC signal.

When the communication module 210 is in an inactive state, if tagging between the user device 200 and the image photographing apparatus 100 is performed, the controller 230 of the user device 200 may change the communication module 210 to an active state and automatically establish communication with the image photographing apparatus 100 using the activated communication module 210 and the connection information that was read by the short-distance wireless communication module 220 (which may an NFC reader).

Figure 3:
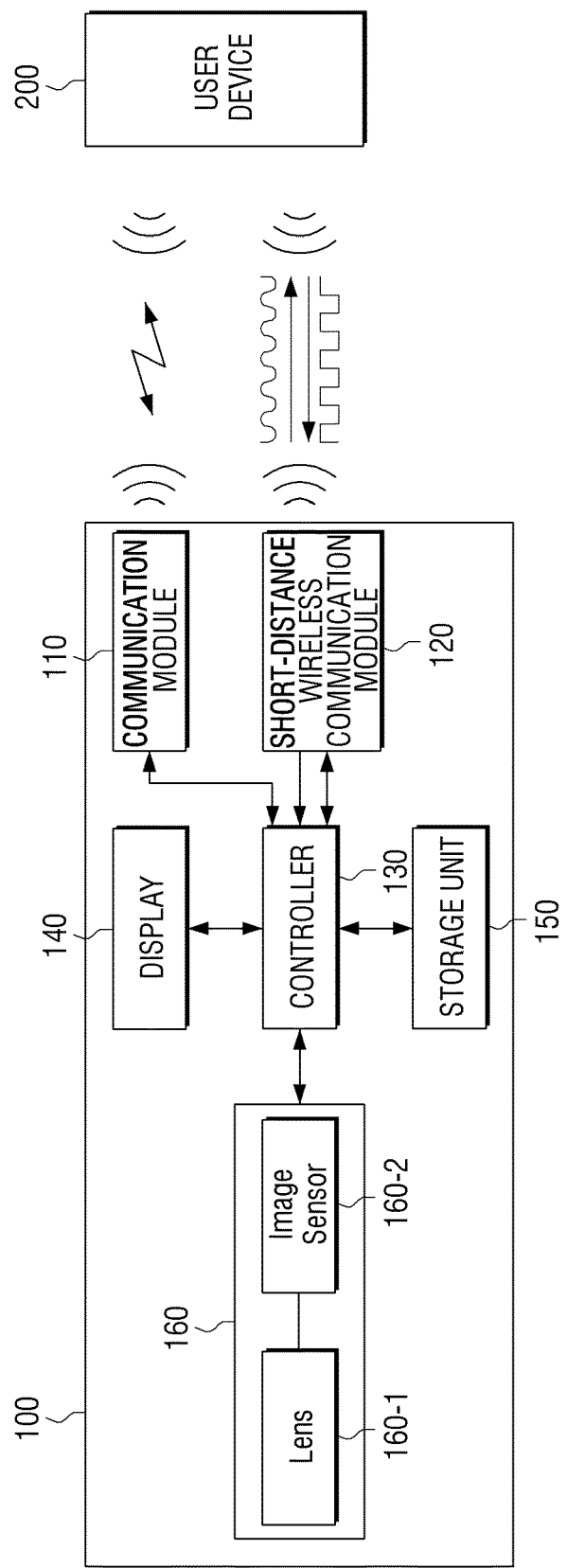

FIG. 3 is a detailed block diagram illustrating the configuration and the connection between the image photographing apparatus 100 and the user device 200. FIG. 3 illustrates the overall components of an embodiment in which the image photographing apparatus 100 has various functions, such as a communication function, a video reproduction function, a display function, etc. According to some embodiments, some components illustrated in FIG. 3 may be omitted or modified or other components may be added.

As illustrated in FIG. 3, the image photographing apparatus 100 may include the communication module 110, the short-distance wireless communication module 120, the controller 130, a display 140, a storage unit 150, and the image capturer 160, and may carry out short-distance wireless communication and other types of communication with the user device 200.

In an embodiment, the communication module 110 of the image photographing apparatus 100 carries out communication between the image photographing apparatus 100 and the user device 200. In order to carry out communication between the image photographing apparatus 100 and the user device 200 using WiFi or Bluetooth®, the communication module 110 may include a WiFi chip, a Bluetooth® chip, or a wireless communication chip. The communication module 110 may be maintained in an inactive state prior to tagging by the user device 200.

The short-distance wireless communication module 120 may carry out short-distance wireless communication such as NFC communication. When NFC communication is used, the short-distance wireless communication module 120 of the image photographing apparatus 100 may include an NFC antenna and an NFC tag chip. The NFC antenna communicates with an NFC reader. When current is supplied to the NFC antenna from the NFC reader, the NFC antenna may form a magnetic field and transmit induction current to operate the NFC tag chip. In addition, the NFC tag chip may transmit an interrupt signal or an NFC signal to the controller 130.

That is, when the controller 130 receives the interrupt signal from the short-distance wireless communication module 120, or when the NFC signal is input to the controller 130 when the controller 130 periodically checks for the NFC signal, the controller 130 may activate the communication module 110 (which was previously in an inactive state) and automatically establish communication with the user device 200 using the activated communication module 110.

The display 140 is a component that displays an image. The display 140 may display a live view in a pre-view mode, display an image captured by the image capturer 160, or display an image stored in the storage unit 150 in a reproduction mode.

When the communication module 110 is activated to automatically establish communication and the display 140 is displaying a live view, the controller 130 may provide the live view to the user device 200. When the display 140 displays an image in a reproduction mode, the controller 130 may provide a reproduction image to the user device 200. Thus, the image photographing apparatus 100 and the user device 200 may simultaneously or separately display the same content.

The storage unit 150 may store various software modules and data for driving the image photographing apparatus 100, and may store an image captured by the image photographing apparatus 100. In addition, the storage unit 150 may receive position information detected by the user device 200, match the position information to the captured image, and store the captured image.

The image capturer 160 may photograph a subject that is desired by a user via the image photographing apparatus 100. The image capturer 160 may include a lens 160-1 and an image sensor 160-2.

In detail, the image capturer 160 may convert an optical signal incident through the lens 160-1 into an electrical signal via an image sensor and capture an image of the subject. In this case, the subject refers to an object containing a background and a main object in the generated captured image. The image sensor 160-2 may be a CCD image sensor or a CMOS image sensor. When light is incident on the lens 160-1, electrons may be generated according to the amount of the light and an image may be generated according to the amount of the generated electrons.

FIG. 3 illustrates an embodiment in which the image photographing apparatus 100 and the user device 200 carry out short-distance wireless communication via NFC communication and carry out WiFi or Bluetooth communication.

That is, when a portion of the user device 200 at which where an NFC reader (i.e., the short-distance wireless communication module 220) is located is tagged onto a portion of the image photographing apparatus 100 at which the short-distance wireless communication module 120 is located, current is supplied to the NFC antenna from the NFC reader to form a magnetic field and the NFC antenna may supply the induced current to operate the NFC tag chip. The operated NFC tag chip may transmit an interrupt signal to the controller 130 or provide connection information to the user device 200. The connection information may be SSID information stored in the NFC tag chip, which can be used by the user device 200 to pair and communicate with the image photographing apparatus 100.

That is, the controller 130 determines whether signals that are equal to or more than a preset amplitude are received at a preset interval. If signals equal to or more than the preset amplitude are continuously received a preset number of times, the controller 130 may convert the communication module 110 from an inactive state to an active state and automatically establish communication with the user device 200.

Figure 4:
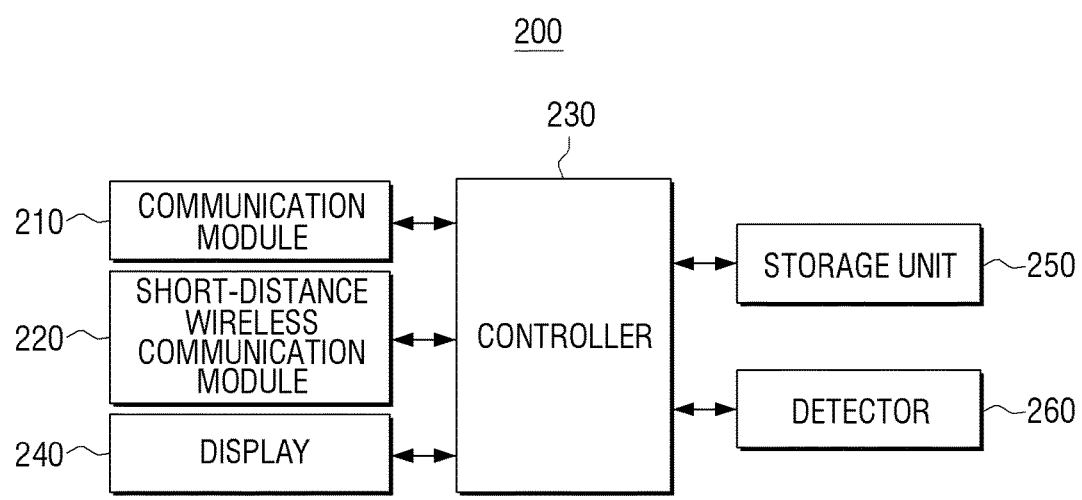
FIG. 4 is a block diagram illustrating configuration of a user device according to an embodiment.

FIG. 4 is a block diagram illustrating a configuration of the user device 200. FIG. 4 illustrates the components in an embodiment where the user device 200 has various functions such as a communication function, a video reproduction function, a display function, etc. According to some embodiments, some components illustrated in FIG. 4 may be omitted or modified or other components may be added.

As illustrated in FIG. 4, the user device 200 may include the communication module 210, the short-distance wireless communication module 220, the controller 230, the display 240, a storage unit 250, and a detector 260.

In an embodiment, the communication module 210 communicates with the image photographing apparatus 100. The communication module may include a WiFi chip, a Bluetooth chip, or a wireless communication chip for communicating with the user device 200 using WiFi or Bluetooth®. The communication module 110 may be maintained in an inactive state prior to tagging taking place between the user device 200 and the image photographing apparatus 100.

The short-distance wireless communication module 220 may carry out short-distance wireless communication. The short-distance wireless communication module 220 may be an NFC reader that carries out short-distance wireless communication according to NFC. That is, connection information, etc. contained in the NFC tag chip may be read by tagging the NFC reader on a portion of the image photographing apparatus 100 containing the communication module 110. The connection information may be SSID information stored in the NFC tag chip, which can be used by the user device 200 to pair and communicate with the image photographing apparatus 100.

The controller 230 may change the communication module 210 from an inactive state to an active state by tagging the NFC reader on a portion of the image photographing apparatus 100 containing the communication module 110, and may automatically establish communication with the image photographing apparatus 100 using the read connection information.

In addition, when the NFC reader receives additional information contained in the NFC tag chip, if communication is automatically established, the display 240 may display an image of a URL address contained in the additional information.

The URL address may be an address of an image for downloading application executable by the user device 200 or an address of an execution image of application when the application is pre-downloaded to the user device 200.

The display 240 is a component for displaying an image. When the NFC reader is tagged on a portion containing the communication module 110 of the image photographing apparatus 100 in order to receive the additional information contained in the NFC tag chip, and if communication is automatically established, the display 240 may display an image of the URL address contained in the additional information.

In addition, when the communication module 210 is activated and communication with the image photographing apparatus 100 is established, the display 240 may change a display image according to a photograph mode of the image photographing apparatus 100. That is, when the image photographing apparatus 100 displays a live view in a pre-view mode, the image photographing apparatus 100 may receive the live view and display the live view on the display 240. When the image photographing apparatus 100 displays an image captured by the image capturer 160 or an image stored in the storage unit 150 in a reproduction mode, the image photographing apparatus 100 may receive the image displayed in the reproduction mode and display the image on the display 240.

The storage unit 250 may store various software modules and data for driving the user device 200 and receive and store an image captured by the image photographing apparatus 100.

The detector 260 may include various types of detection sensors such as a gyro sensor, an acceleration sensor, a gravity sensor, a touch sensor, etc. according to the features and type of the user device 200. In particular, the detector 260 may include a position detection sensor such as a global positioning system (GPS), etc. Thus, when the pre-view is received from the image photographing apparatus 100 and the pre-view is displayed on the display 240, the user device 200 may be tagged on the short-distance wireless communication module 120 of the image photographing apparatus 100 and position information may be transmitted to store the position information together with a position where the image photographing apparatus 100 captures an image.

Figure 5:
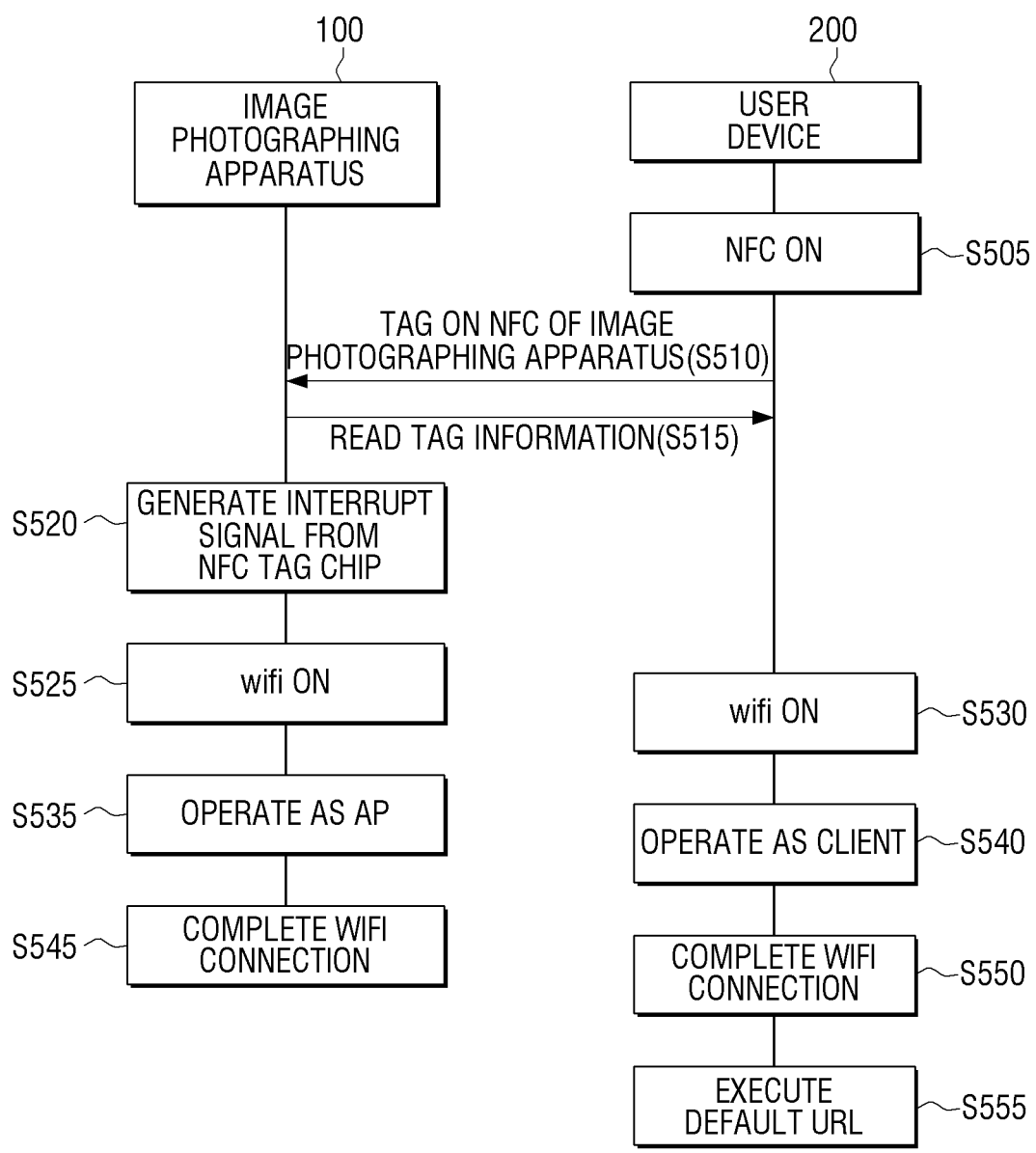
FIG. 5 is a flowchart for explanation of a method for automatically establishing communication between an image photographing apparatus and a user device using an NFC communication method according to an embodiment.

FIG. 5 is a flowchart for explanation of a method for automatically establishing communication between the image photographing apparatus 100 and the user device 200 using an NFC communication method.

The user device 200 turns on an NFC function (S505). The NFC function of the user device 200 selects ON.

The user device 200 is tagged on the NFC of the image photographing apparatus 100 (S510). In order to indicate portions of the image photographing apparatus 100 and the user device 200 containing the short-distance wireless communication modules 120 and 220 for NFC communication, NFC communication indicators may be formed on outer surfaces of the image photographing apparatus 100 and the user device 200. Thus, the accuracy of NFC communication may be improved via tagging on NFC communication indicators, which are on the portions of the image photographing apparatus 100 and the user device 200 containing the short-distance wireless communication modules 120 and 220.

When the user device 200 is tagged on the NFC of the image photographing apparatus 100, current flows to an NFC antenna of the image photographing apparatus 100 from an NFC reader of the user device 200, the NFC antenna generates a magnetic field based on the current flowing in the NFC reader and operates the NFC tag chip, and the NFC reader reads tag information (S515). The tag information may include connection information and additional information. The connection information may be SSID information stored in the NFC tag chip and the additional information may be URL information. The SSID information may be used by the user device 200 to pair and communicate with the image photographing apparatus 100. The URL information refers to a download address of application supposed to be displayed or an address of application when the user device 200 establishes communication.

The NFC tag chip generates an interrupt signal (S520). That is, the NFC tag chip operated by the NFC antenna may generate the interrupt signal and transmit the interrupt signal to the controller 130 of the image photographing apparatus 100, and WiFi is turned on according to the transmitted interrupt signal (S525). That is, the controller 130 may convert the communication module 110 from an inactive state to an active state to turn on WiFI according to the transmitted interrupt signal.

In this case, the user device 200 converts the communication module 210 from an inactive state to an active state to turn on WiFi (S530).

When the WiFi of the image photographing apparatus 100 and the user device 200 is turned on, the image photographing apparatus 100 may operate as an AP (S535). That is, the image photographing apparatus 100 uses WiFi in an infrastructure mode during WiFi communication and operates as an AP. A technology for wireless communication using an AP as a relay is a known technology and thus a detailed description thereof is not given here.

The user device 200 operates as a client (S540). That is, the user device 200 may be connected to the AP of the image photographing apparatus 100 and operate as the client using the SSID information—i.e., the connection information read by the NFC reader.

The WiFi connection of the image photographing apparatus 100 is completed (S545) and WiFi connection of the user device 200 is completed (S550).

When the WiFi connection of the user device 200 is completed, a default URL may be executed (S555). The NFC reader of the user device 200 may have received the default URL address as additional information together with the connection information. The URL address may be an application address or a download address of application for displaying an image and various functions when the user device 200 communicates with the image photographing apparatus 100 over WiFi. Thus, when the user device 200 displays an image captured by the image photographing apparatus 100, and an application for control of a function of the image photographing apparatus 100 is not present, a URL address of the NFC reader may be connected to an image (e.g., a Google player) for downloading the application.

When an application is present in the user device 200, the user device 200 may execute the URL read by the NFC reader to execute the application.

According to the aforementioned communication method of the image photographing apparatus 100 and the user device 200, a user may perform a simple operation of tagging the user device 200 on the image photographing apparatus 100 to automatically establish communication.

Figure 6:
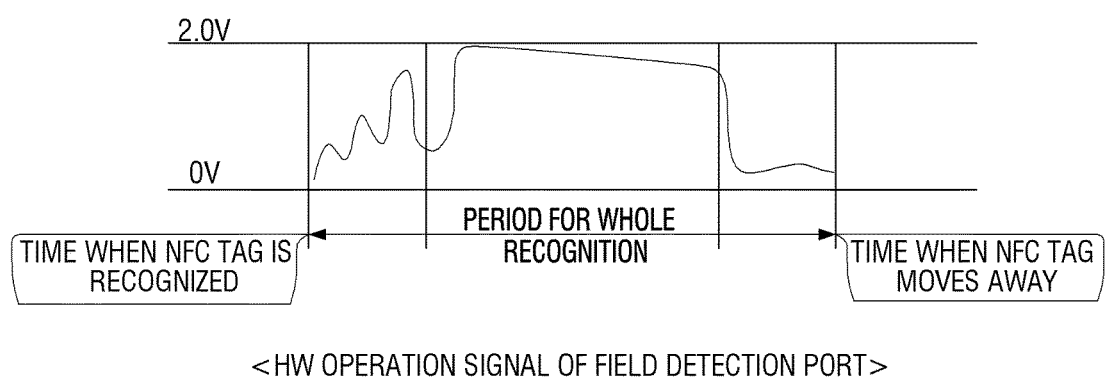
FIGS. 6 and 7 are diagrams illustrating a generated signal during short-distance wireless communication according to an embodiment.
Figure 7:
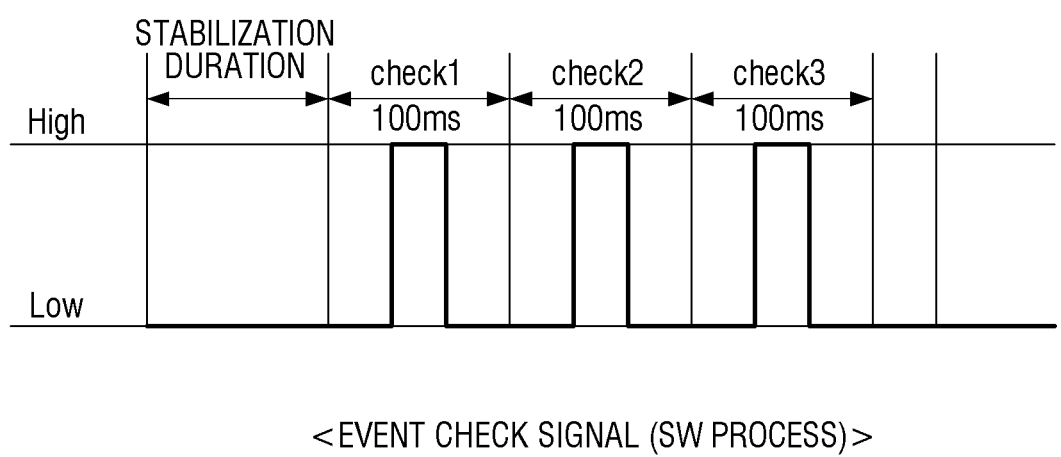

FIGS. 6 and 7 are diagrams illustrating a signal when the image photographing apparatus 100 and the user device 200 perform short-distance wireless communication via NFC communication. The NFC reader of the user device 200 may be tagged on the short-distance wireless communication module 120 of the image photographing apparatus 100 to generate an interrupt signal from the NFC tag chip of the short-distance wireless communication module 120. Alternatively, the controller 130 of the image photographing apparatus 100 may periodically check, by polling, whether an NFC signal is received.

In particular, FIG. 6 is a diagram illustrating a case in which the NFC tag chip generates an interrupt signal. The NFC reader is tagged on the NCF antenna to supply current and a magnetic field is generated in the NFC antenna. Then, when induced current is transmitted to the NFC tag chip, the NFC tag chip is operated. The operated NFC tag chip transmits the interrupt signal to the controller 130.

That is, as seen from FIG. 6, the interrupt signal transmitted to the controller 130 from the NFC tag chip is generated from a point of time when an NFC tag is recognized. When a sufficient period of time does not elapse after tagging, the interrupt signal does not reach a preset amplitude and is unstably applied to the controller 130. When the sufficient period of time elapses, the NFC tag chip applies a signal with a preset amplitude to the controller 130. When the NFC tag moves away, the transmission of the interrupt signal is stopped.

FIG. 7 illustrates a case in which the controller 130 of the image photographing apparatus 100 periodically checks, by polling, whether an NFC signal is input.

That is, the controller 130 may check signals generated from the NFC tag chip at a preset interval a preset number of times to determine whether NFC communication is established. As seen from FIG. 7, the signals are checked at an interval of 100 ms three times and high signals with a preset amplitude are continuously polled three times, and thus, the controller 130 may determine that the NFC signal is input.

In FIGS. 6 and 7, the controller 130 may determine that NFC communication is established, activate the communication module 110 (from an inactive state), and automatically establish communication with the user device 200.

Figure 8:
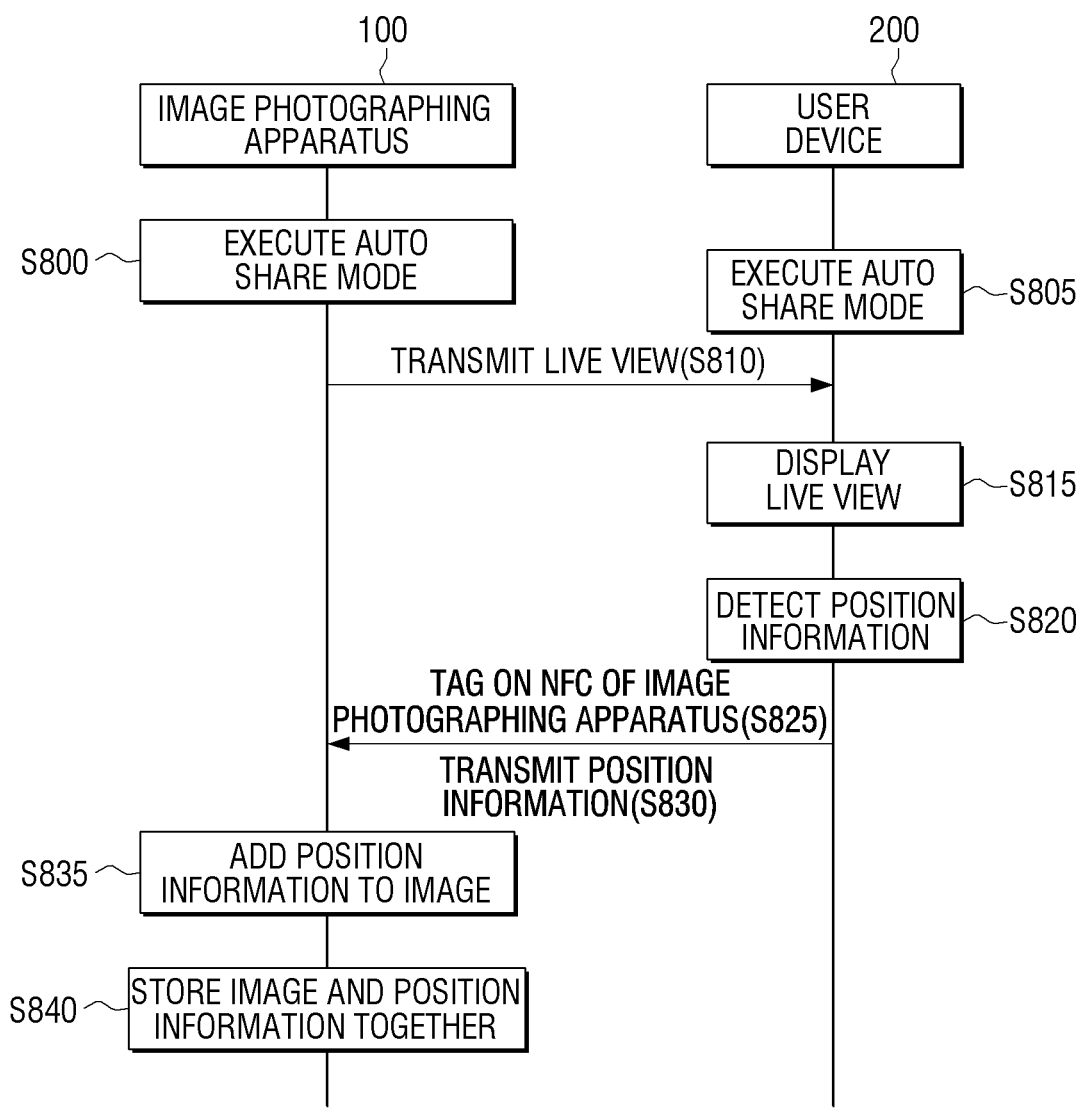
FIG. 8 is a flowchart of a method for receiving position information from a user device according to an embodiment.

FIG. 8 is a flowchart of a method for transmitting a live view captured by the image photographing apparatus 100 to the user device 200, and for receiving position information from the user device 200 when communication between the image photographing apparatus 100 and the user device 200 is automatically established.

The image photographing apparatus 100 executes an auto share mode (S800) and the user device 200 also executes the auto share mode (S805). The auto share mode is a mode for sharing an image captured by the image capturer 160 of the image photographing apparatus 100 when wireless communication between the image photographing apparatus 100 and the user device 200 is established.

Accordingly, when the auto share mode is executed, the image photographing apparatus 100 transmits the live view to the user device 200 (S810). That is, an image captured by the image capturer 160 of the image photographing apparatus 100 may be transmitted to the user device 200 via wireless communication in real time.

The user device 200 displays the live view (S815). That is, the display 240 of the user device 200 may display the image captured by the image photographing apparatus 100.

The user device 200 detects position information (S820). The detector 260 of the user device 200 may include a position detection sensor and detect a position where an image is captured using the position detection sensor. That is, the image photographing apparatus 100 and the user device 200 are connected via wireless communication such as Wifi, Bluetooth, etc. and thus are present within a valid distance. Thus, a portion where an image detected by the user device 200 is photographed is positioned within a valid distance from the image photographing apparatus 100.

In addition, before and after the user device 200 detects the position information, the image photographing apparatus 100 or the user device 200 may capture an image.

The user device 200 is tagged on the NFC of the image photographing apparatus 100 (S825). When the tagging is performed, the user device 200 transmits the detected position information (S830). That is, the communication modules 110 and 210, which were in an inactive mode, may be activated and also transmit and receive various types of information such as position information via NFC communication.

The image photographing apparatus 100 adds the position information to the captured image (S835). In addition, the image photographing apparatus 100 stores the image and position information together (S840).

According to the aforementioned method, even if the image photographing apparatus 100 does not include a position detection sensor such as a GPS, a user may contain the position information in the image captured by the image photographing apparatus 100 and store the image using a position detection sensor included in the user device 200.

Figure 9:
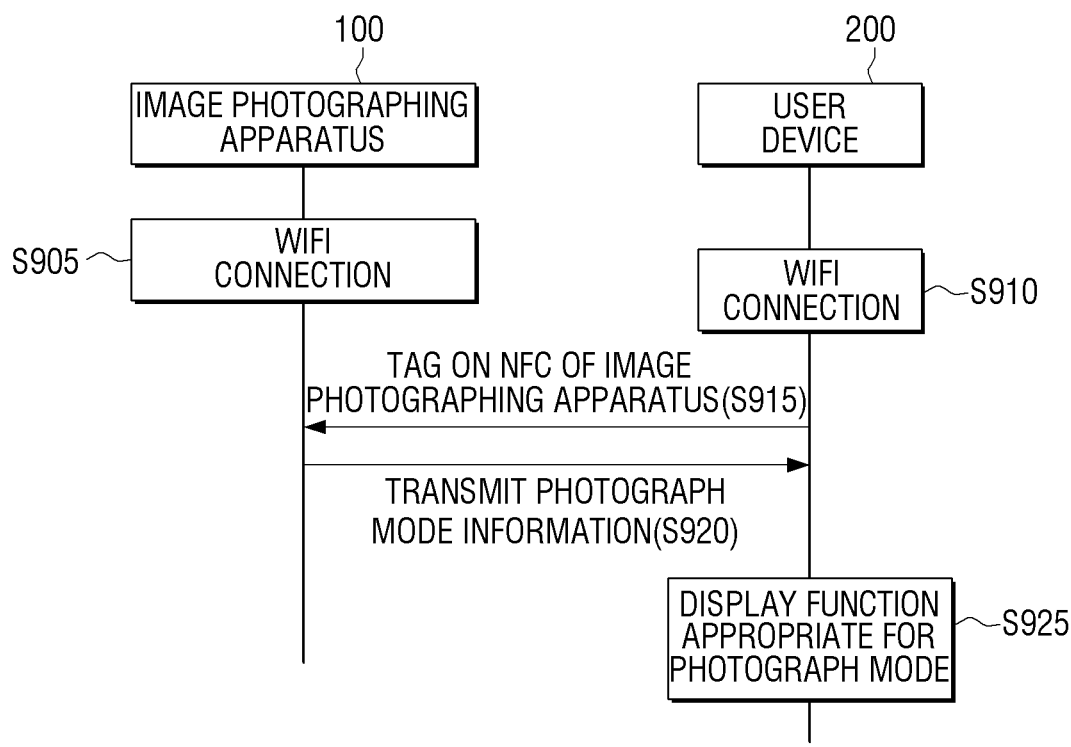
FIG. 9 is a flowchart of a method for displaying a function appropriate for a photograph mode of an image photographing apparatus by a user device according to an embodiment.

FIG. 9 is a flowchart of a method for transmitting photograph mode information via NFC communication and automatically displaying a function appropriate for the transmitted photograph mode when communication between the image photographing apparatus 100 and the user device 200 is automatically established.

The image photographing apparatus 100 and the user device 200 are connected via WiFi using the method described with reference to FIGS. 5 (S905 and S910). When the user device 200 is tagged on NFC of the image photographing apparatus 100 (S915), the image photographing apparatus 100 transmits photograph mode information (S920). The user device 200 displays a function appropriate for the photograph mode (S925).

For example, in a pre-view mode in which the image photographing apparatus 100 captures an image via a live-view, the image photographing apparatus 100 may use an auto share mode in which the live-view captured by the image capturer 160 of the image photographing apparatus 100 is shared, and a function of a remote view finder for inputting a photograph command of an image captured by the image capturer 160 of the image photographing apparatus 100 via the user device 200.

Thus, when the user device 200 is tagged on NFC of the image photographing apparatus 100 and receives information of a pre-view mode, the display 240 of the user device 200 may display a plurality of functions used in the pre-view function and be used to select a function. In addition, the display 240 may display a preset function.

That is, in the pre-view mode, when the user device 200 is established to use the auto share mode, if the user device 200 is tagged on the NFC of the image photographing apparatus 100 and receives the information of the pre-view mode, the display 240 of the user device 200 displays an image in the auto share mode.

In addition, in a reproduction mode for displaying an image captured or pre-stored by the image photographing apparatus 100, the image photographing apparatus 100 may use a share function that involves attaching an image reproduced in a reproduction mode to an e-mail and transmitting the e-mail. The image photographing apparatus 100 may also use a mobile link function that involves selecting the image reproduced in the reproduction mode and transmitting the image to a smart phone or a tablet PC.

Thus, when the user device 200 is tagged on the NFC of the image photographing apparatus 100 and receives information of a reproduction mode, the display 240 of the user device 200 may display a plurality of functions used in the reproduction mode and select a function. In addition, the display 240 may automatically display a preset function.

Additionally, when the user device 200 is set to use the mobile link function, the user device 200 may be tagged on the NFC of the image photographing apparatus 100, receive information of a reproduction mode, and execute the mobile link function.

Figure 10:
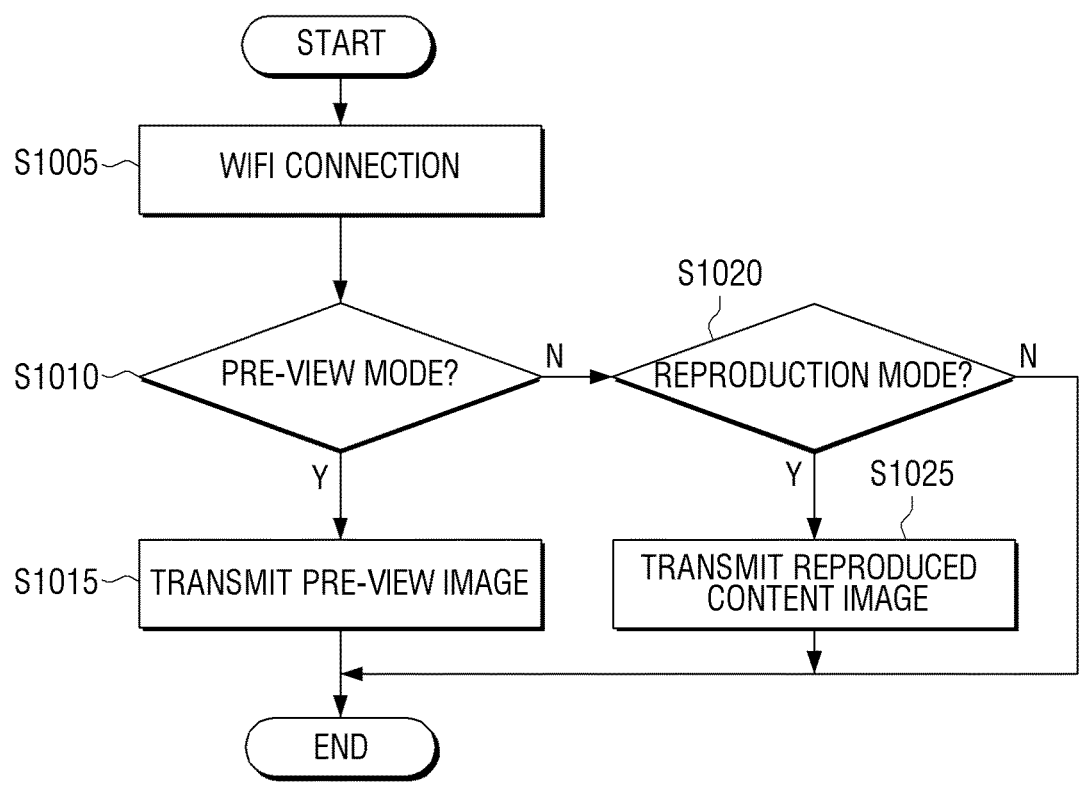
FIG. 10 is a flowchart of a controlling method for displaying a function appropriate for a photograph mode to a user device by an image photographing apparatus according to an embodiment.

FIG. 10 is a flowchart of a controlling method for displaying a function appropriate for a photograph mode to a user device by an image photographing apparatus.

When the image photographing apparatus 100 is automatically connected to WiFi (S1005), the image photographing apparatus 100 determines whether an image displayed by the display 140 of the image photographing apparatus 100 is in a pre-view mode for displaying a live view (S1010). When the image is in the pre-view mode (S1010-Y), a pre-view image is transmitted (S1015). When the image is not in the pre-view mode (S1010-N), the image photographing apparatus 100 determines whether a current mode is a reproduction mode for displaying an image captured by the image capturer 160 or stored by the storage unit 150 (S1020). In case of the reproduction mode (S1020-Y), a reproduced content image is transmitted (S1025).

Figure 11:
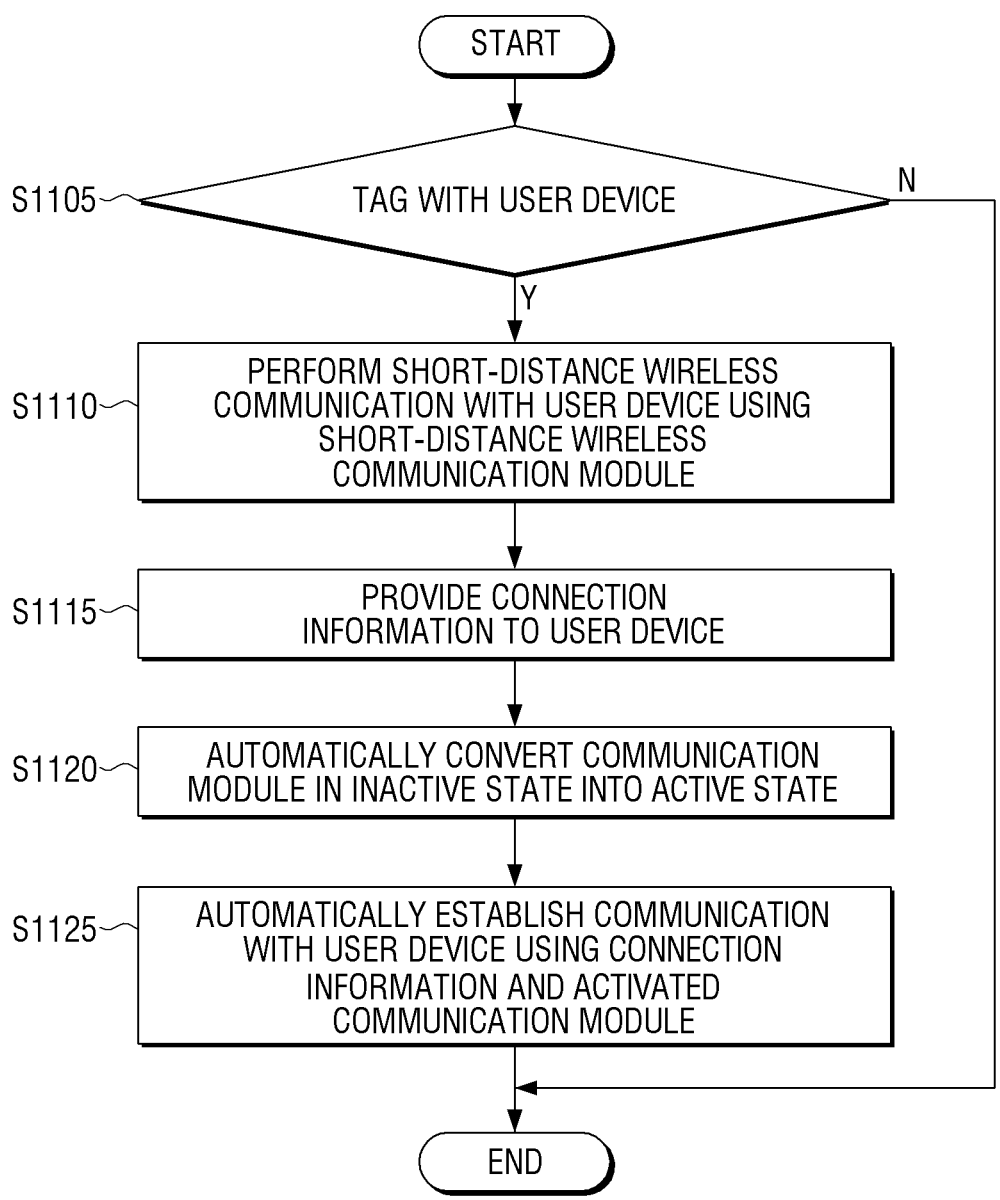
FIG. 11 is a flowchart of a method for establishing communication of an image photographing apparatus according to an embodiment.

FIG. 11 is a flowchart of a method for establishing communication of the image photographing apparatus 100. Whether tagging with the user device 200 is performed is determined (S1105). When it is determined that tagging with the user device 200 is performed (S1105-Y), short-distance communication with the user device 200 is performed using a short-distance communication module (S1110) and connection information is provided to the user device 200 (S1115). In addition, the communication module 110 is automatically converted from an inactive to an active state (S1120) and communication with the user device 200 is automatically established using the connection information and the activated communication module (S1125).

FIG. 12 is a flowchart of a method for establishing communication of the user device 200. Whether tagging with the image photographing apparatus 100 is performed is determined (S1205). When it is determined that the tagging with the image photographing apparatus 100 is performed (S1205-Y), short-distance communication with the image photographing apparatus 100 is performed (S1210) and connection information stored in the image photographing apparatus 100 is read (S1215). In addition, the communication module 210 in an inactive state is automatically converted into an active state according to the tagging (S1220). In addition, communication with the image photographing apparatus 100 is automatically established using the read connection information and the activated the communication module 210 (S1225).

The image photographing apparatus 100 may receive a position detected by a position detection sensor of the user device 200 via short-distance wireless communication and perform short-distance wireless communication to transmit a photograph mode of the image photographing apparatus 100 to the user device 200. This embodiment has been already described in detail with regard to the aforementioned embodiments and thus a flowchart and detailed description thereof is omitted here.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the have been described with reference to the figures, it will be understood by those of ordinary skill in the art that various changes in form and details may be made therein without departing from their spirit and scope of as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding, reference has been made to the embodiments illustrated in the drawings, and specific language has been used to describe these embodiments. However, no limitation of the scope of the disclosure is intended by this specific language, and the embodiments described herein should be construed to encompass all embodiments that would normally occur to one of ordinary skill in the art. The terminology used herein is for the purpose of describing the particular embodiments and is not intended to be limiting of exemplary embodiments. In the description of the embodiments, certain detailed explanations of related art are omitted when it is deemed that they may unnecessarily obscure the description.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art may easily implement functional programs, codes, and code segments for making and using the embodiments described herein.

The various embodiments may be described in terms of functional block components and various processing steps. Such functional blocks may be realized by any number of hardware and/or software components configured to perform the specified functions. For example, some embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, they may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the embodiments described herein may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the description and does not pose a limitation on the scope unless otherwise claimed. Numerous modifications and adaptations will be readily apparent to those of ordinary skill in this art without departing from the spirit and scope of the disclosure as defined by the following claims. Therefore, the scope is defined not by the detailed description but by the following claims, and all differences within the scope will be construed as being included in the disclosure.

No item or component is essential unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of the description (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An image photographing apparatus comprising:
a near field communication (NFC) module;
a wireless communication module; and
a processor configured to control the NFC module to:
transmit tag information for communication which uses the wireless communication module to a user device in response to tagging between the image photographing apparatus and the user device, and
establish the communication with the user device using the wireless communication module,
wherein the tag information comprises application information associated with an application to be executed by the user device for sharing image data stored in the image photographing apparatus.

2. The image photographing apparatus as claimed in claim 1, wherein the application information comprises uniform resource locator (URL) information for downloading an application executable by the user device.

3. The image photographing apparatus as claimed in claim 1, wherein the application information comprises address information on an execution screen of an application executable by the user device.

4. The image photographing apparatus as claimed in claim 1, wherein the tag information further comprises connection information for communication between the image photographing apparatus and the user device.

5. The image photographing apparatus as claimed in claim 1, wherein the NFC module comprises:
an NFC antenna; and
an NFC tag chip including a memory storing the tag information.

6. The image photographing apparatus as claimed in claim 1, wherein the processor, in response to the tagging of the user device being detected through the NFC module, is further configured to:
receive an NFC signal from the NFC module, and
activate the wireless communication module in response to the NFC signal.

7. An image photographing apparatus comprising:
a near field communication (NFC) module configured to transmit tag information to an external device in response to tagging between the NFC module and the external device, wherein the tag information comprises application information associated with an application to be executed by the external device for sharing image data stored in the image photographing apparatus;
a wireless communication module; and
a processor configured to control the wireless communication module to:
establish communication with the external device in response to the tagging between the NFC module and the external device, and
transmit the image data to the external device executing the application.

8. The image photographing apparatus as claimed in claim 7, wherein the application information comprises uniform resource locator (URL) information for downloading an application executable by the external device.

9. The image photographing apparatus as claimed in claim 7, wherein the application information comprises address information on an execution screen of an application executable by the external device.

10. The image photographing apparatus as claimed in claim 7, wherein the tag information further comprises connection information for communication between the image photographing apparatus and the external device.

11. The image photographing apparatus as claimed in claim 7, wherein the NFC module comprises:
an NFC antenna; and
an NFC tag chip including a memory storing the tag information.

12. The image photographing apparatus as claimed in claim 7, wherein the processor, in response to the tagging of the external device being detected through the NFC module, is further configured to:
receive an NFC signal from the NFC module, and
activate the wireless communication module in response to the NFC signal.

13. An electronic device comprising:
a near field communication (NFC) module;
a wireless communication module; and
a processor configured to control the NFC module to:
transmit tag information for communication which uses the wireless communication module to a user device in response to tagging between the electronic device and the user device, and
establish the communication with the user device using the wireless communication module,
wherein the tag information comprises application information associated with an application to be executed by the user device for sharing image data between the electronic device and the user device.

14. The electronic device as claimed in claim 13, wherein the processor, in response to the tagging of the user device being detected through the NFC module, is further configured to:
receive an NFC signal from the NFC module, and
activate the wireless communication module in response to the NFC signal.

15. The electronic device as claimed in claim 13, wherein the processor, in response to a control command being received from the user device, is further configured to perform an operation based on the control command.

16. The electronic device as claimed in claim 13, wherein the application information comprises uniform resource locator (URL) information for downloading an application executable by the user device or address information on an execution screen of the application executable by the user device.

17. The electronic device as claimed in claim 13, wherein the tag information further comprises connection information for the communication between the electronic device and the user device.

18. The electronic device as claimed in claim 13, wherein the NFC module comprises:
an NFC antenna; and
an NFC tag chip including a memory storing the tag information.

19. An electronic device comprising:
a near field communication (NFC) module configured to transmit tag information to an external device in response to tagging between the NFC module and the external device, wherein the tag information comprises application information associated with an application to be executed by the external device for sharing image data between the electronic device and the external device;

a wireless communication module; and a processor configured to control the wireless communication module to:

establish communication with the external device, in response to the tagging between the NFC module and the external device, and share the image data with the external device executing the application.

20. The electronic device as claimed in claim 19, wherein the processor, in response to the tagging of the external device being detected through the NFC module, is further configured to receive an NFC signal from the NFC module, and activate the wireless communication module in response to the NFC signal.

* * * * *